(12) United States Patent
Carey et al.

(10) Patent No.: US 7,416,508 B1
(45) Date of Patent: Aug. 26, 2008

(54) MULTI-SPEED TRANSMISSION

(75) Inventors: Clinton E. Carey, Monroe, MI (US);
Andrew W. Phillips, Saline, MI (US);
Edwin T. Grochowski, Howell, MI
(US); Scott H. Wittkopp, Ypsilanti, MI
(US); James M. Hart, Belleville, MI
(US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/928,166

(22) Filed: Oct. 30, 2007

Related U.S. Application Data

(62) Division of application No. 11/780,202, filed on Jul. 19, 2007.

(60) Provisional application No. 60/909,156, filed on Mar. 30, 2007.

(51) Int. Cl.
*F16H 3/62* (2006.01)

(52) U.S. Cl. ..................................................... 475/275
(58) Field of Classification Search ................. 475/275, 475/276
See application file for complete search history.

(56) References Cited

U.S. PATENT DOCUMENTS

| | | | | | |
|---|---|---|---|---|---|
| 4,683,776 | A | * | 8/1987 | Klemen | 475/286 |
| 7,226,381 | B2 | * | 6/2007 | Klemen | 475/275 |
| 7,341,537 | B2 | * | 3/2008 | Klemen | 475/276 |
| 2008/0064556 | A1 | * | 3/2008 | Kamm et al. | 475/276 |

\* cited by examiner

*Primary Examiner*—Ha D. Ho

(57) ABSTRACT

A multi-speed transmission has four planetary gear sets and five torque-transmitting mechanisms packaged in at least one of six possible zones within the transmission casing. The torque-transmitting mechanisms are selectively engagable in different combinations to achieve eight forward speed ratios and a reverse speed ratio between the input member and the output member.

19 Claims, 4 Drawing Sheets

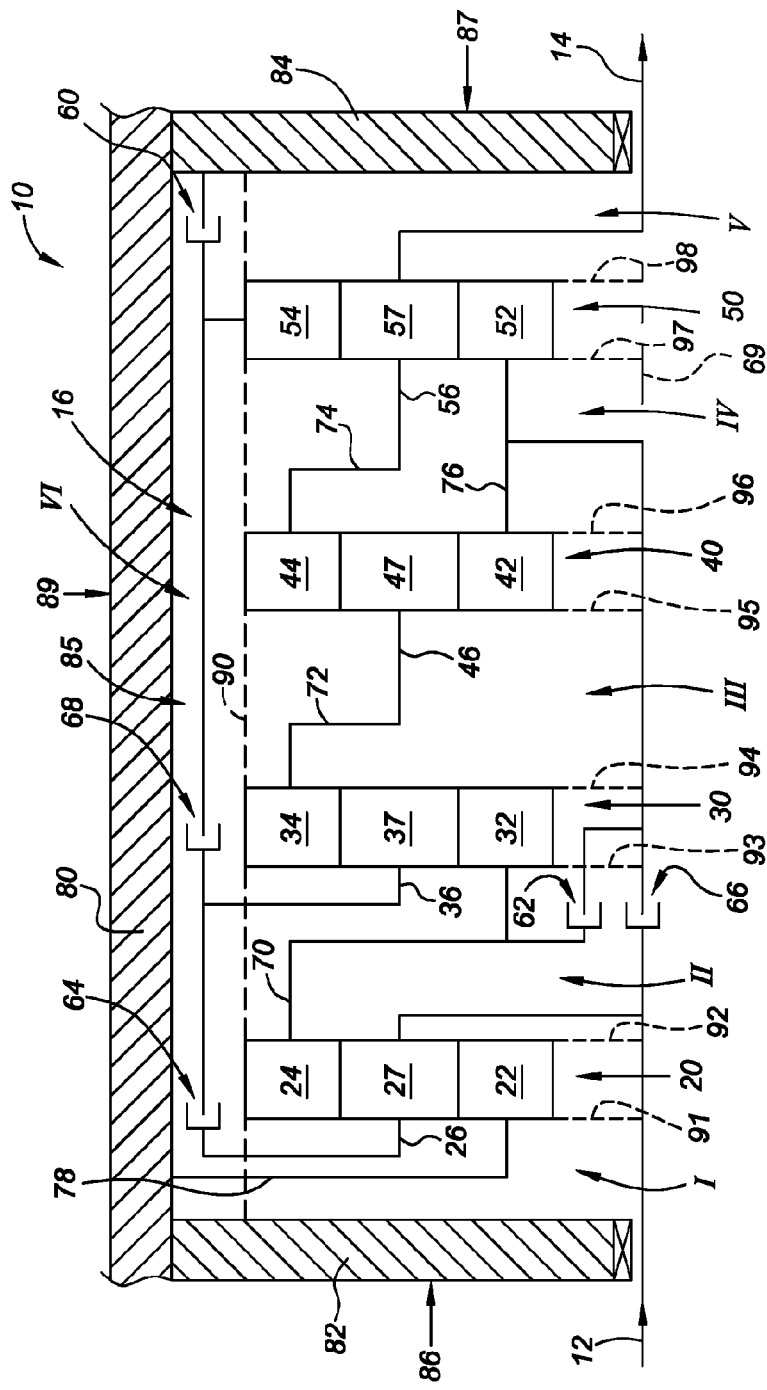

MULTI-SPEED TRANSMISSION

CROSS-REFERENCE TO RELATED APPLICATIONS

This application claims the benefit of U.S. Provisional Application No. 60/909,156, filed Mar. 30, 2007, and is a divisional application of U.S. patent application Ser. No. 11/780,202, filed Jul. 19, 2007, both of which are hereby incorporated by reference in their entireties.

TECHNICAL FIELD

This invention relates to a multi-speed transmission for a vehicle providing a plurality of forward speed ratios and at least one reverse speed ratio through selective engagement of five torque-transmitting mechanisms located in a selected zone or zones of the transmission.

BACKGROUND OF THE INVENTION

Multi-speed transmissions in automotive vehicles allow for operating efficiency and smooth feel. Multiple planetary gear sets have been utilized to provide eight or more forward speed ratios with relatively efficient packaging due to the compact nature of planetary gear sets. A number of selectively engagable torque-transmitting mechanisms are controlled to interconnect different members of the planetary gear sets with one another, with the transmission casing, or sometimes with the transmission input or output member to achieve the various speed ratios. Efficient packaging of the torque-transmitting mechanisms helps to minimize the overall dimensions of the transmission, potentially allowing its use in more vehicle platforms, reducing weight, and minimizing manufacturing complexity.

SUMMARY OF THE INVENTION

A multi-speed transmission is provided with four planetary gear sets, each having a first, a second and a third rotatable member. Certain pairs of the members are continuously connected for common rotation. Specifically, the second member of the first planetary gear set is continuously connected for common rotation with the first member of the second planetary gear set. The second member of the second planetary gear set is continuously connected for common rotation with the first member of the third planetary gear set. The second member of the third planetary gear set is continuously connected for common rotation with the first member of the fourth planetary gear set. The third member of the third planetary gear set is continuously connected for common rotation with the third member of the fourth planetary gear set. The third member of the first planetary gear set is grounded to the transmission casing. Preferably, an input member is continuously connected for common rotation with the first member of the first planetary gear set and an output member is continuously interconnected for common rotation with the first member of the fourth planetary gear set.

Five torque-transmitting mechanisms are selectively engagable to connect selected members of the planetary gear sets for common rotation. The five torque-transmitting mechanisms are engagable in different combinations to achieve eight forward speed ratios and a reverse speed ratio between the input member and the output member.

A transmission casing surrounds the planetary gear sets and torque-transmitting mechanisms and defines a cavity having six different zones. The transmission casing includes opposing first and second end walls and a housing portion. As used herein, a "zone" is a portion of the cavity. A first zone extends axially from the first end wall to one of the planetary gear sets. A second, a third, and a fourth zone each extend between different adjacent pairs of the planetary gear sets. A fifth zone extends from another one of the planetary gear sets to the second end wall. Each of the first, second, third, fourth, and fifth zones extend radially to an outer surface of a radially outermost one of the members. A sixth zone borders the first, second, third, fourth and fifth zones, extends radially outward to the housing portion and extends axially between the first and second walls.

Each torque-transmitting mechanism may be located in selected ones of the zones that further desirability of (i) minimizing the overall size of the transmission, (ii) reducing weight, (iii) providing a convenient location for hydraulic feed to the torque-transmitting mechanism, such as by locating the torque-transmitting mechanism close to the transmission casing or to a centrally-located shaft, both of which typically define at least part of a feed path to supply hydraulic fluid to torque-transmitting mechanisms, and (iv) reducing the overall complexity (e.g., the number, shape and size of hub members and other interconnecting members used to connect members of the planetary gear sets with one another or with the transmission casing). Different embodiments of the transmission are possible by arranging the planetary gear sets in a different order (e.g., the order moving axially from the first end wall to the second end wall) in the transmission. The five torque-transmitting mechanisms are located in at least one of the six zones in each such embodiment within the scope of the invention.

The five torque-transmitting mechanisms may include four rotating-type clutches and one stationary-type clutch, with the stationary-type clutch grounding the second member of the fourth planetary gear set to the transmission housing. Alternatively, the five torque-transmitting mechanisms may all be rotating-type clutches.

Preferably, the first, second, and third members of each planetary gear set are a ring gear member, a carrier member, and a sun gear member, although not necessarily in that order. Preferably, the input member is continuously interconnected for common rotation with the carrier member of the first planetary gear set; the ring gear member of the first planetary gear set is continuously connected for common rotation with the sun gear member of the second planetary gear set; the ring gear member of the third planetary gear set is continuously connected for common rotation with the carrier member of the fourth planetary gear set; the sun gear member of the first planetary gear set is grounded to the transmission casing; the ring gear member of the second planetary gear set is continuously connected for common rotation with the carrier member of the third planetary gear set; the sun gear member of the third planetary gear set is continuously connected for common rotation with the sun gear member of the fourth planetary gear set; and the output member is continuously connected for common rotation with the carrier member of the fourth planetary gear set.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1A is a schematic, cross-sectional, partially fragmentary illustration of a first embodiment of a multi-speed transmission within the scope of the invention showing different zones within the transmission;

FIG. 1B is a chart listing the selected zones in which various torque-transmitting mechanisms of the transmission of FIG. 1A may be located;

DESCRIPTION OF THE PREFERRED EMBODIMENTS

Figures 2A, 2B:
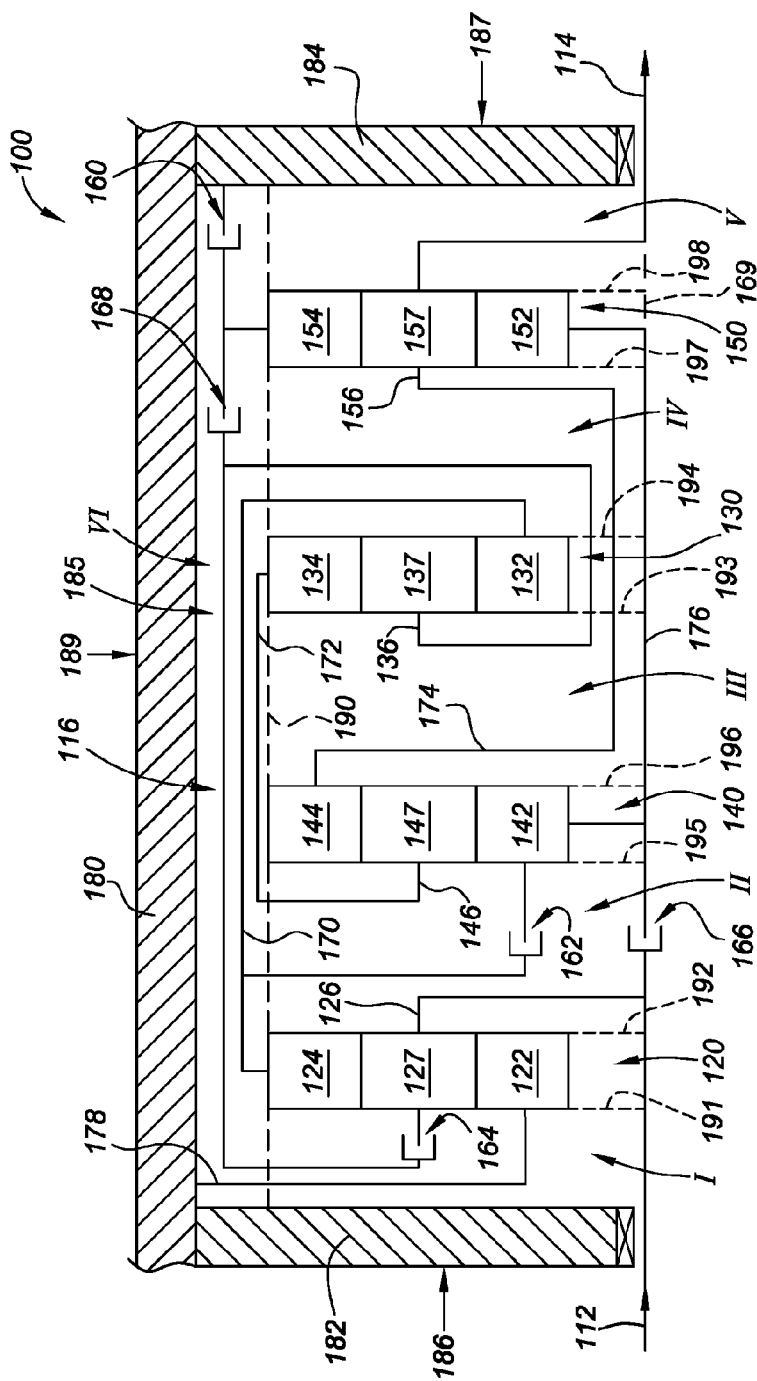
FIG. 2A is a schematic, cross-sectional, partially fragmentary illustration of a second embodiment of a multi-speed transmission within the scope of the invention showing different zones within the transmission.
FIG. 2B is a chart listing the selected zones in which various torque-transmitting mechanisms of the transmission of FIG. 2A may be located.

Referring to the drawings, wherein like reference numbers refer to like components, FIG. 1A shows a transmission 10 having an input member 12 for receiving power from a power source such as an internal combustion engine and output member 14 for delivering power to a final drive mechanism such as the wheels of a vehicle. The transmission 10 includes a gearing arrangement 16 having four planetary gear sets 20, 30, 40 and 50 and five selectively engageable torque-transmitting mechanisms 60, 62, 64, 66, and 68. Only that portion of the transmission 10 above an axis of rotation 69 of the input and output members 12, 14 is shown. Those skilled in the art will recognize that the planetary gear sets 20, 30, 40 and 50 as well as torque-transmitting mechanisms 60, 62, 64, 66, and 68 are symmetrical about the axis of rotation 69. Each planetary gear set 20, 30, 40 and 50 includes concentric rotatable components. Specifically, planetary gear set 20 includes a sun gear member 22, a ring gear member 24 and a carrier member 26 that rotatably supports a plurality of pinion gears 27 that intermesh with both the sun gear member 22 and the ring gear member 24. Planetary gear set 30 includes a sun gear member 32, a ring gear member 34 and a carrier member 36 that rotatably supports a plurality of pinion gears 37 that intermesh with both the sun gear member 32 and the ring gear member 34. Planetary gear set 40 includes a sun gear member 42, a ring gear member 44 and a carrier member 46 that rotatably supports a plurality of pinion gears 47 that intermesh with both the sun gear member 42 and the ring gear member 44. Planetary gear set 50 includes a sun gear member 52, a ring gear member 54 and a carrier member 56 that rotatably supports a plurality of pinion gears 57 that intermesh with both the sun gear member 52 and the ring gear member 54.

In referring to the first, second, third and fourth planetary gear sets in this description and in the claims, these sets may be counted "first" to "fourth" in any order in the drawings (i.e., left to right, right to left, etc.). Additionally, the first, second or third members of each gear set may be counted "first" to "third" in any order in the drawings (i.e., top to bottom, bottom to top, etc.) for each gear set. In the embodiment of FIG. 1A, planetary gear set 20 is the first planetary gear set, planetary gear set 30 is the second planetary gear set, planetary gear set 40 is the third planetary gear set, and planetary gear set 50 is the fourth planetary gear set.

The input member 12 is continuously connected for common rotation with carrier member 26. The output member 14 is continuously connected for common rotation with carrier member 56. An interconnecting member 70 continuously interconnects ring gear member 24 for common rotation with sun gear member 32. An interconnecting member 72 continuously interconnects ring gear member 34 for common rotation with carrier member 46. An interconnecting member 74 continuously interconnects ring gear member 44 for common rotation with carrier member 56. An interconnecting member 76 continuously interconnects sun gear member 42 for common rotation with sun gear member 52. Each of the interconnecting members 70, 72, 74 and 76 may be one component or multiple components. The sun gear member 22 is continuously grounded to a housing 80 (also referred to herein as a housing portion) of the transmission 10 via a radially-extending structural member 78. The housing 80 circumferentially surrounds the gear sets 20, 30, 40 and 50 as well as the torque-transmitting mechanisms 60, 62, 64, 66 and 68. The transmission 10 further includes a first end wall 82 generally at one end of the transmission 10 and a second end wall 84 generally at an opposing end of the transmission 10. The housing 80 joins the first and second end walls 82, 84. It should be appreciated that the housing 80 and the first and second end walls 82, 84 form a transmission casing and may be integrated, or may each be a separate component or components of the casing. The transmission casing will be referred to herein as 80, 82, 84. The transmission casing 80, 82, 84 defines a cavity 85. The end walls 82 and 84 enclose the cavity 85 axially, but are likely a conical or irregular shape rather than a planar shape as schematically depicted.

The planetary gear sets 20, 30, 40, and 50 and torque-transmitting mechanisms 60, 62, 64, 66 and 68 are located in the cavity 85. The transmission casing 80, 82, 84 and the planetary gear sets 20, 30, 40, and 50 cooperate to define six spaces or zones I-VI within the cavity 85. A first zone I is defined between an outer surface 86 of the first end wall 82 and a plane 91 running generally parallel with a side of the planetary gear set 20 adjacent the first end wall 82, and runs radially outward to a circumferential boundary 90 running along a radially-outermost surface of each of the ring gear members 24, 34, 44 and 54. A second zone II is defined between a plane 92 running generally parallel along a side of the planetary gear set 20 facing the planetary gear set 30, a plane 93 running generally parallel along a side of the planetary gear set 30 facing the planetary gear set 20 and the circumferential boundary 90. A third zone III is defined between a plane 94 running generally parallel along a side of the planetary gear set 30 facing the planetary gear set 40, a plane 95 running generally parallel along a side of the planetary gear set 40 facing the planetary gear set 30 and the circumferential boundary 90. A fourth zone IV is defined between a plane 96 running generally parallel along a side of the planetary gear set 40 facing the planetary gear set 50, a plane 97 running generally parallel along a side of the planetary gear set 50 facing the planetary gear set 40 and the circumferential boundary 90. A fifth zone V is defined between a plane 98 running generally parallel along a side of the planetary gear set 50 facing the second end wall 84, an outer surface 87 of the second end wall 84 and the circumferential boundary 90. A sixth zone VI is defined between the circumferential boundary 90, an outer surface 89 of the housing 80, and the outer surfaces 86 and 87 of the first and second end walls 82 and 84, respectively. The structural member 78 traverses zones I and VI.

Torque-transmitting mechanisms 62, 64, 66 and 68 are rotating-type clutches and torque-transmitting mechanism 60 is a brake, also referred to as a reaction clutch or a stationary clutch. Torque-transmitting mechanism 60 is selectively engagable to ground ring gear member 54 to second end wall 84. The torque-transmitting mechanism 62 is selectively engagable to connect the ring gear member 24 for common rotation with the sun gear members 42 and 52. The torque-transmitting mechanism 64 is selectively engagable to connect the carrier member 26 for common rotation with the carrier member 36. The torque-transmitting mechanism 66 is selectively engagable to connect the input member 12 and the carrier member 26 for common rotation with the sun gear members 42 and 52. The torque-transmitting mechanism 68 is selectively engagable to connect the carrier member 36 for common rotation with ring gear member 54.

The transmission 10 provides eight forward speed ratios and one reverse speed ratio between the input member 12 and the output member 14. Specifically, a reverse speed ratio is established by engaging torque-transmitting mechanisms 60 and 68; a first forward speed ratio is established by engaging torque-transmitting mechanisms 60 and 66; a second forward speed ratio is established by engaging torque-transmitting mechanisms 60 and 62; a third forward speed ratio is established by engaging torque-transmitting mechanisms 60 and 64; a fourth forward speed ratio is established by engaging torque-transmitting mechanisms 62 and 64; a fifth forward speed ratio is established by engaging torque-transmitting mechanisms 64 and 66; a sixth forward speed ratio is established by engaging torque-transmitting mechanisms 64 and 68; a seventh forward speed ratio is established by engaging torque-transmitting mechanisms 66 and 68; and an eighth forward speed ratio is established by engaging torque-transmitting mechanisms 62 and 68. Thus, all upshifts and downshifts between subsequent speed ratios are single transition shifts. Those skilled in the art will recognize that the combinations of torque-transmitting mechanisms described above provide eight different numerical speed ratios and a reverse speed ratio. Preferably, in all embodiments of the invention, the tooth ratios are selected so that at least two of the speed ratios are overdrive ratios.

As shown in FIG. 1A, torque-transmitting mechanisms 62 and 66 are located in zone II; and torque-transmitting mechanisms 60, 64 and 68 are located in zone VI. Alternatively, the interconnections between the various gear members, the input member 12, the output member 14 and the transmission casing 80, 82, 84 obtained by selective engagement of the various torque-transmitting mechanisms 60, 62, 64, 66 and 68 as described above are possible with the torque-transmitting mechanisms 60, 62, 64, 66 and 68 disposed in other zones as shown in the chart of FIG. 1B. An "X" in the chart of FIG. 1B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 1B is feasible independently of the other rows. Accordingly, torque-transmitting mechanism 60 is locatable in any of four of the six possible zones; torque-transmitting mechanism 62 is locatable in any of three of the six possible zones; torque-transmitting mechanism 64 is locatable in any of three of the six possible zones; torque transmitting mechanism 66 is locatable in any of four of the six possible zones; and torque-transmitting mechanism 68 is locatable in any of five of the six possible zones.

A second embodiment of a transmission 100 within the scope of the invention is shown in FIG. 2A. Transmission 100 has an input member 112 for receiving power from a power source such as an internal combustion engine and output member 114 for delivering power to a final drive mechanism such as the wheels of a vehicle.

The transmission 100 includes a gearing arrangement 116 having four planetary gear sets 120, 130, 140 and 150 and five selectively engagable torque-transmitting mechanisms 160, 162, 164, 166 and 168. Only that portion of the transmission 100 above an axis of rotation 169 of the input and output members 112, 114 is shown. Those skilled in the art will recognize that the planetary gear sets 120, 130, 140 and 150 as well as torque-transmitting mechanisms 160, 162, 164, 166, and 168 are symmetrical about the axis of rotation 169. In the embodiment of FIG. 2A, planetary gear set 120 is the first planetary gear set, planetary gear set 130 is the second planetary gear set, planetary gear set 140 is the third planetary gear set, and planetary gear set 150 is the fourth planetary gear set.

Each planetary gear set 120, 130, 140 and 150 includes concentric rotatable components. Specifically, planetary gear set 120 includes a sun gear member 122, a ring gear member 124 and a carrier member 126 that rotatably supports a plurality of pinion gears 127 that intermesh with both the sun gear member 122 and the ring gear member 124. Planetary gear set 130 includes a sun gear member 132, a ring gear member 134 and a carrier member 136 that rotatably supports a plurality of pinion gears 137 that intermesh with both the sun gear member 132 and the ring gear member 134. Planetary gear set 140 includes a sun gear member 142, a ring gear member 144 and a carrier member 146 that rotatably supports a plurality of pinion gears 147 that intermesh with both the sun gear member 142 and the ring gear member 144. Planetary gear set 150 includes a sun gear member 152, a ring gear member 154 and a carrier member 156 that rotatably supports a plurality of pinion gears 157 that intermesh with both the sun gear member 152 and the ring gear member 154.

The input member 112 is continuously connected for common rotation with carrier member 126. The output member 114 is continuously connected for common rotation with carrier member 156. An interconnecting member 170 continuously interconnects ring gear member 124 for common rotation with sun gear member 132. An interconnecting member 172 continuously interconnects carrier member 146 for common rotation with ring gear member 134. An interconnecting member 174 continuously interconnects ring gear member 144 for common rotation with carrier member 156. An interconnecting member 176 continuously interconnects sun gear member 142 for common rotation with sun gear member 152. Each of the interconnecting members 170, 172, 174 and 176 may be one component or multiple components. The sun gear member 122 is continuously grounded to a housing 180 (also referred to herein as a housing portion) of the transmission 100 via a radially-extending structural member 178. The housing 180 circumferentially surrounds the gear sets 120, 130, 140 and 150 as well as the torque-transmitting mechanisms 160, 162, 164, 166 and 168. The transmission 100 further includes a first end wall 182 generally at one end of the transmission 100 and a second end wall 184 generally at an opposing end of the transmission 100. The housing 180 joins the first and second end walls 182, 184. It should be appreciated that the housing 180 and the first and second end walls 182, 184 form a transmission casing and may be integrated or separate components of the casing. The transmission casing will be referred to herein as 180, 182, 184. The transmission casing 180, 182, 184 defines a cavity 185. The end walls 182 and 184 enclose the cavity 185 axially, but are likely a conical or irregular shape rather than a planar shape as schematically depicted.

The planetary gear sets 120, 130, 140, and 150 and torque-transmitting mechanisms 160, 162, 164, 166 and 168 are located in the cavity 185. The transmission casing 180, 182, 184 and the planetary gear sets 120, 130, 140, and 150 cooperate to define six spaces or zones I-VI within the cavity 185. A first zone I is defined between an outer surface 186 of the first end wall 182 and a plane 191 running generally parallel with a side of the planetary gear set 120 adjacent the first end wall 182, and runs radially outward to a circumferential boundary 190 running along a radially-outermost surface of each of the ring gear members 124, 134, 144 and 154. A second zone II is defined between a plane 192 running generally parallel along a side of the planetary gear set 120 facing the planetary gear set 140, a plane 195 running generally parallel along a side of the planetary gear set 140 facing the planetary gear set 120 and the circumferential boundary 190. A third zone III is defined between a plane 196 running generally parallel along a side of the planetary gear set 140 facing the planetary gear set 130, a plane 193 running generally parallel along a side of the planetary gear set 130 facing the planetary gear set 140 and the circumferential boundary 190. A fourth zone IV is defined between a plane 194 running generally parallel along a side of the planetary gear set 130 facing planetary gear set 150, a plane 197 running generally parallel along a side of the planetary gear set 150 facing planetary gear set 140 and the circumferential boundary 190. A fifth zone V is defined between a plane 198 running generally parallel along a side of the planetary gear set 150 facing the second end wall 184, an outer surface 187 of the second end wall 184 and the circumferential boundary 190. A sixth zone IV is defined between the circumferential boundary 190, an outer surface 189 of the housing 180, and the outer surfaces 186 and 187 of the first and second end walls 182 and 184, respectively. The structural member 178 traverses zones I and VI.

Torque-transmitting mechanisms 162, 164, 166 and 168 are rotating-type clutches and torque-transmitting mechanism 160 is a brake, also referred to as a reaction clutch. Torque-transmitting mechanism 160 is selectively engagable to ground the ring gear member 154 to the second wall 184. The torque-transmitting mechanism 162 is selectively engagable to connect the ring gear member 124 and the sun gear member 132 for common rotation with the sun gear member 142. The torque-transmitting mechanism 164 is selectively engagable to connect the carrier member 126 for common rotation with the carrier member 136. The torque-transmitting mechanism 166 is selectively engagable to connect the input member 112 and the carrier member 126 for common rotation with the sun gear member 142 and the sun gear member 152.

The transmission 100 provides eight forward speed ratios and one reverse speed ratio between the input member 112 and the output member 114. Specifically, a reverse speed ratio is established by engaging torque-transmitting mechanisms 160 and 168; a first forward speed ratio is established by engaging torque-transmitting mechanisms 160 and 166; a second forward speed ratio is established by engaging torque-transmitting mechanisms 160 and 162; a third forward speed ratio is established by engaging torque-transmitting mechanisms 160 and 164; a fourth forward speed ratio is established by engaging torque-transmitting mechanisms 162 and 164; a fifth forward speed ratio is established by engaging torque-transmitting mechanisms 164 and 166; a sixth forward speed ratio is established by engaging torque-transmitting mechanisms 164 and 168; a seventh forward speed ratio is established by engaging torque-transmitting mechanisms 166 and 168; and an eighth forward speed ratio is established by engaging torque-transmitting mechanisms 162 and 168. Thus, single transition upshifts and downshifts are used between subsequent speed ratios.

As shown in FIG. 2A, torque-transmitting mechanism 164 is located in zone I; torque-transmitting mechanisms 162 and 166 are located in zone II; and torque-transmitting mechanisms 160 and 168 are located in zone VI. Alternatively, the interconnections between the various gear members, the input member 112, the output member 114 and the casing 180, 182, 184 obtained by selective engagement of the various torque-transmitting mechanisms 160, 162, 164, 166 and 168 as described above are possible with the torque-transmitting mechanisms 160, 162, 164, 166 and 168 disposed in other zones as shown in the chart of FIG. 2B. An "X" in the chart of FIG. 2B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 2B is feasible independently of the other rows. Accordingly, torque-transmitting mechanism 160 is locatable in any of three possible zones; torque-transmitting mechanism 162 is locatable in any of three of the six possible zones; torque-transmitting mechanism 164 is locatable in any of two of the six possible zones; torque transmitting mechanism 166 is locatable in any of three of the six possible zones; and torque-transmitting mechanism 168 is locatable in any of four of the six possible zones.

Figures 3A, 3B:
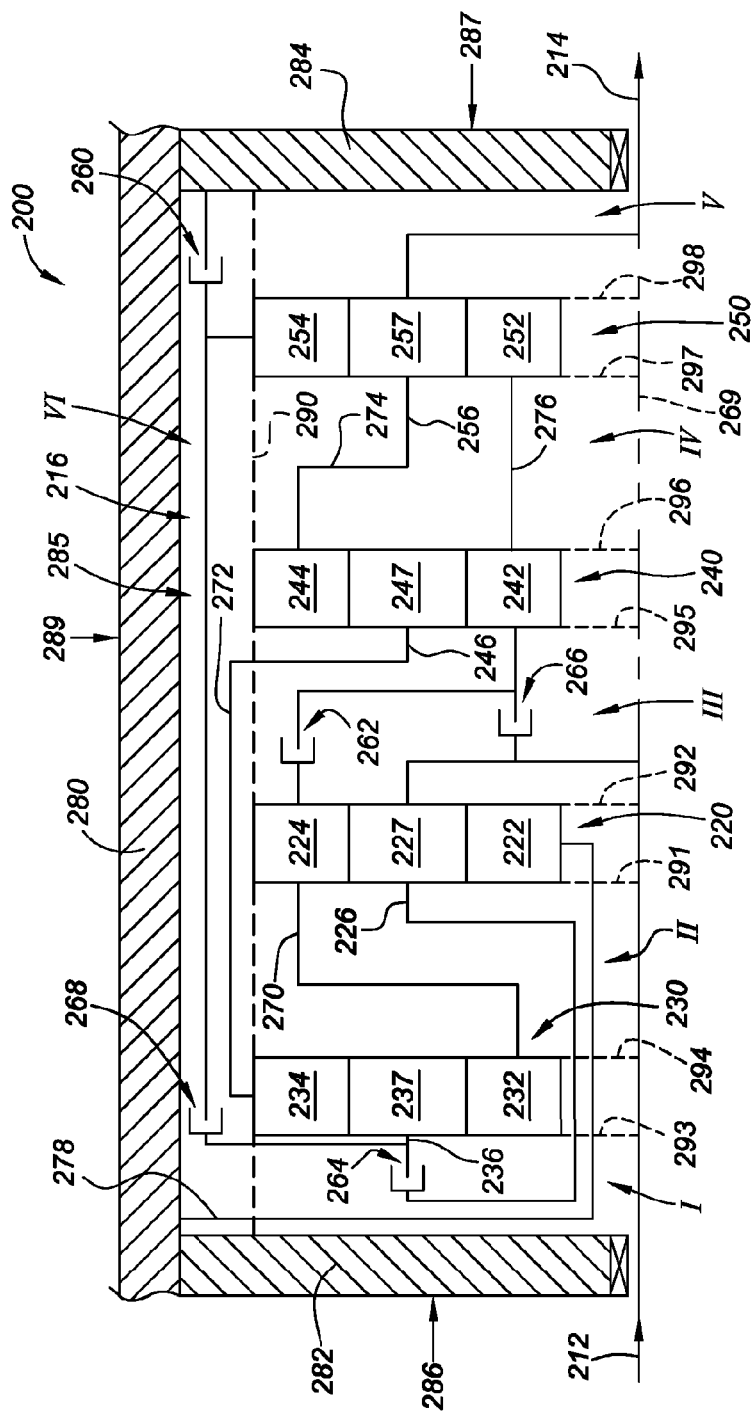
FIG. 3A is a schematic, cross-sectional, partially fragmentary illustration of a third embodiment of a multi-speed transmission within the scope of the invention showing different zones within the transmission.
FIG. 3B is a chart listing the selected zones in which various torque-transmitting mechanisms of the transmission of FIG. 3A may be located.

A third embodiment of a transmission 200 within the scope of the invention is shown in FIG. 3A. Transmission 200 has an input member 212 for receiving power from a power source such as an internal combustion engine and output member 214 for delivering power to a final drive mechanism such as the wheels of a vehicle.

The transmission 200 includes a gearing arrangement 216 having four planetary gear sets 220, 230, 240 and 250, and five selectively engagable torque-transmitting mechanisms 260, 262, 264, 266 and 268. Only that portion of the transmission 200 above an axis of rotation 269 of the input and output members 212, 214 is shown. Those skilled in the art will recognize that the planetary gear sets 220, 230, 240 and 250 as well as torque-transmitting mechanisms 260, 262, 264, 266, and 268 are symmetrical about the axis of rotation 269. In the embodiment of FIG. 3A, planetary gear set 220 is the first planetary gear set, planetary gear set 230 is the second planetary gear set, planetary gear set 240 is the third planetary gear set, and planetary gear set 250 is the fourth planetary gear set.

Each planetary gear set 220, 230, 240 and 250 includes concentric rotatable components. Specifically, planetary gear set 220 includes a sun gear member 222, a ring gear member 224 and a carrier member 226 that rotatably supports a plurality of pinion gears 227 that intermesh with both the sun gear member 222 and the ring gear member 224. Planetary gear set 230 includes a sun gear member 232, a ring gear member 234 and a carrier member 236 that rotatably supports a plurality of pinion gears 237 that intermesh with both the sun gear member 232 and the ring gear member 234. Planetary gear set 240 includes a sun gear member 242, a ring gear member 244 and a carrier member 246 that rotatably supports a plurality of pinion gears 247 that intermesh with both the sun gear member 242 and the ring gear member 244. Planetary gear set 250 includes a sun gear member 252, a ring gear member 254 and a carrier member 256 that rotatably supports a plurality of pinion gears 257 that intermesh with both the sun gear member 252 and the ring gear member 254.

The input member 212 is continuously connected for common rotation with carrier member 226. The output member 214 is continuously connected for common rotation with carrier member 256. An interconnecting member 270 continuously connects sun gear member 232 for common rotation with ring gear member 224. An interconnecting member 272 continuously connects ring gear member 234 for common rotation with carrier member 246. An interconnecting member 274 continuously connects ring gear member 244 for common rotation with carrier member 256. An interconnecting member 276 continuously connects sun gear member 242 for common rotation with sun gear member 252. The interconnecting members 272, 274, and 276 may each be one component or multiple components. The sun gear member 222 is continuously grounded to a housing 280 of the transmission 200 via a radially-extending structural member 278. The housing 280 circumferentially surrounds the gear sets 220, 230, 240 and 250 as well as the torque-transmitting mechanisms 260, 262, 264, 266, and 268. The transmission 200 further includes a first end wall 282 generally at one end of the transmission 200 and a second end wall 284 generally at an opposing end of the transmission 200. The housing 280 joins the first and second end walls 282, 284. It should be appreciated that the housing 280 and the first and second end walls 282, 284 form a transmission casing and may be integrated or separate components of the casing. The transmission casing will be referred to herein as 280, 282, 284. The transmission casing 280, 282, 284 defines a cavity 285. The end walls 282 and 284 enclose the cavity 285 axially, but are likely a conical or irregular shape rather than a planar shape as schematically depicted.

The planetary gear sets 220, 230, 240, and 250 and torque-transmitting mechanisms 260, 262, 264, 266 and 268 are located in the cavity 285. The transmission casing 280, 282, 284 and the planetary gear sets 220, 230, 240, and 250 cooperate to define six spaces or zones I-VI within the cavity 285. A first zone I is defined between an outer surface 286 of the first end wall 282 and a plane 293 running generally parallel with a side of the planetary gear set 230 adjacent the first end wall 282, and runs radially outward to a circumferential boundary 290 running along a radially-outermost surface of each of the ring gear members 224, 234, 244 and 254. A second zone II is defined between a plane 294 running generally parallel along a side of the planetary gear set 230 facing the planetary gear set 220, a plane 291 running generally parallel along a side of the planetary gear set 220 facing the planetary gear set 230 and the circumferential boundary 290. A third zone III is defined between a plane 292 running generally parallel along a side of the planetary gear set 220 facing the planetary gear set 240, a plane 295 running generally parallel along a side of the planetary gear set 240 facing the planetary gear set 220 and the circumferential boundary 290. A fourth zone IV is defined between a plane 296 running generally parallel along a side of the planetary gear set 240 facing the planetary gear set 250, a plane 297 running generally parallel along a side of planetary gear set 250 facing planetary gear set 240, and the circumferential boundary 290. A fifth zone V is defined between a plane 298 running generally parallel along a side of the planetary gear set 250 facing the second end wall 284, an outer surface 287 of the second end wall 284 and the circumferential boundary 290. A sixth zone VI is defined between the circumferential boundary 290, an outer surface 289 of the housing 280, and the outer surfaces 286 and 287 of the first and second end walls 282 and 284, respectively. The structural member 278 traverses zones I and VI.

Torque-transmitting mechanisms 262, 264, 266, and 268 are rotating-type clutches and torque-transmitting mechanism 260 is a brake, also referred to as a reaction clutch. The torque-transmitting mechanism 260 is selectively engagable to ground the ring gear member 254 to the second wall 284. Torque-transmitting mechanism 262 is selectively engagable to connect the ring gear member 224 for common rotation with the sun gear member 242. The torque-transmitting mechanism 264 is selectively engagable to connect the carrier member 226 for common rotation with the carrier member 236. The torque-transmitting mechanism 266 is selectively engagable to connect the input member 212 and the carrier member 226 for common rotation with the sun gear member 242. The torque-transmitting mechanism 268 is selectively engagable to connect the carrier member 236 for common rotation with the ring gear member 254.

The transmission 200 provides eight forward speed ratios and one reverse speed ratio between the input member 212 and the output member 214. Specifically, a reverse speed ratio is established by engaging torque-transmitting mechanisms 260 and 268; a first forward speed ratio is established by engaging torque-transmitting mechanisms 260 and 266; a second forward speed ratio is established by engaging torque-transmitting mechanisms 260 and 262; a third forward speed ratio is established by engaging torque-transmitting mechanisms 260 and 264; a fourth forward speed ratio is established by engaging torque-transmitting mechanisms 262 and 264; a fifth forward speed ratio is established by engaging torque-transmitting mechanisms 264 and 266; a sixth forward speed ratio is established by engaging torque-transmitting mechanisms 264 and 268; a seventh forward speed ratio is established by engaging torque-transmitting mechanisms 266 and 268; and an eighth forward speed ratio is established by engaging torque-transmitting mechanisms 262 and 268. Thus, single transition upshifts and downshifts are used between subsequent speed ratios.

As shown in FIG. 3A, torque-transmitting mechanism 264 is located in zone I; torque-transmitting mechanisms 262 and 266 are located in zone III; and torque-transmitting mechanisms 260 and 268 are located in zone VI. Alternatively, the interconnections between the various gear members, the input member 212, the output member 214 and the transmission casing 280, 282, 284 obtained by selective engagement of the various torque-transmitting mechanisms 260, 262, 264, 266 and 268 as described above are possible with the torque-transmitting mechanisms 260, 262, 264, 266 and 268 disposed in other zones as shown in the chart of FIG. 3B. An "X" in the chart of FIG. 3B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 3B is feasible independently of the other rows. Accordingly, torque-transmitting mechanism 260 is locatable in any of four possible zones; torque-transmitting mechanism 262 is locatable in any of three of the six possible zones; torque-transmitting mechanism 264 is locatable in any of three of the six possible zones; torque transmitting mechanism 266 is locatable in any of three of the six possible zones; and torque-transmitting mechanism 268 is locatable in any of four of the six possible zones.

Figures 4A, 4B:
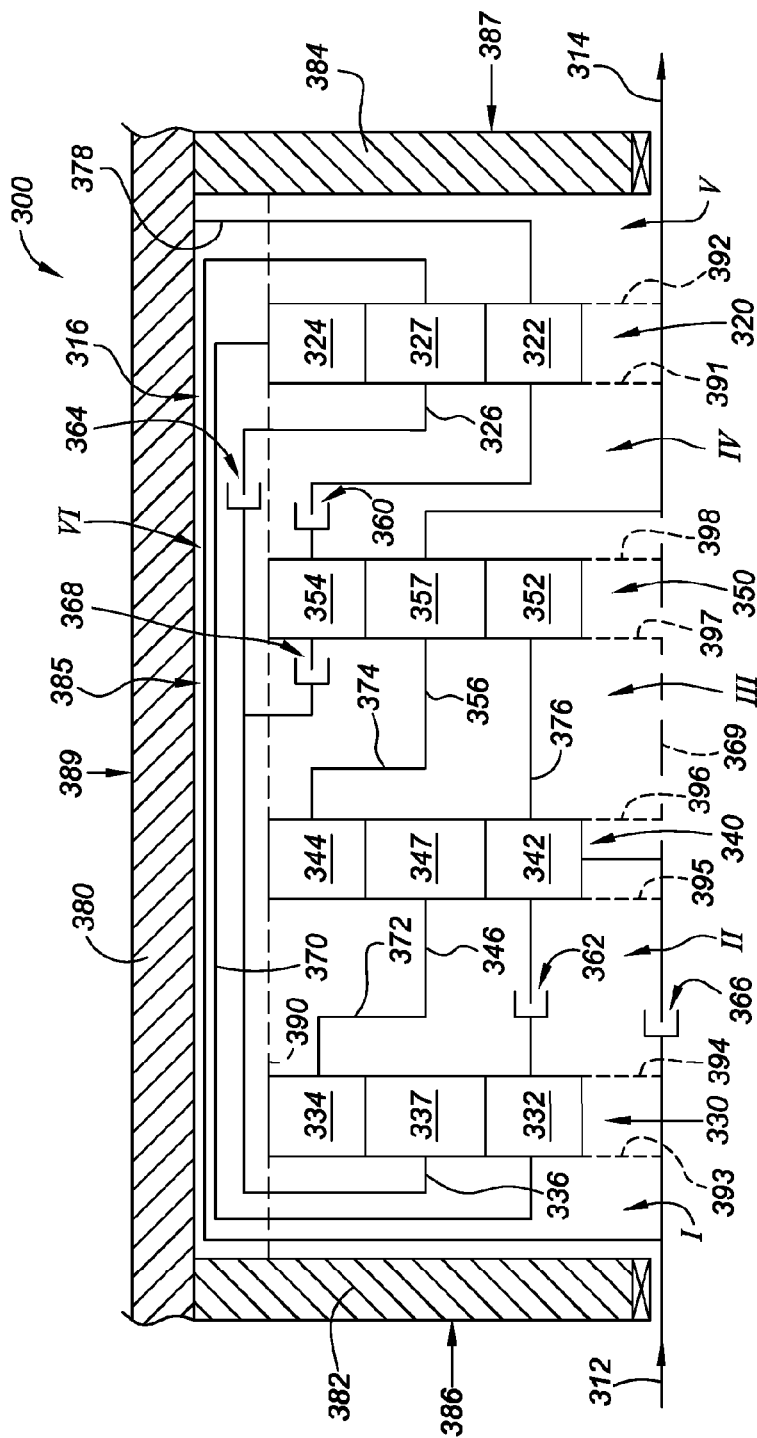
FIG. 4A is a schematic, cross-sectional, partially fragmentary illustration of a fourth embodiment of a multi-speed transmission within the scope of the invention showing different zones within the transmission.
FIG. 4B is a chart listing the selected zones in which various torque-transmitting mechanisms of the transmission of FIG. 4A may be located.

A fourth embodiment of a transmission 300 within the scope of the invention is shown in FIG. 4A. Transmission 300 has an input member 312 for receiving power from a power source such as an internal combustion engine and output member 314 for delivering power to a final drive mechanism such as the wheels of a vehicle.

The transmission 300 includes a gearing arrangement 316 having four planetary gear sets 320, 330, 340 and 350 and five selectively engagable torque-transmitting mechanisms 360, 362, 364, 366, and 368. Only that portion of the transmission 300 above an axis of rotation 369 of the input and output members 312, 314 is shown. Those skilled in the art will recognize that the planetary gear sets 320, 330, 340 and 350 as well as torque-transmitting mechanisms 360, 362, 364, 366, and 368 are symmetrical about the axis of rotation 369. In the embodiment of FIG. 4A, planetary gear set 320 is the first planetary gear set, planetary gear set 330 is the second planetary gear set, planetary gear set 340 is the third planetary gear set, and planetary gear set 350 is the fourth planetary gear set.

Each planetary gear set 320, 330, 340 and 350 includes concentric rotatable components. Specifically, planetary gear set 320 includes a sun gear member 322, a ring gear member 324 and a carrier member 326 that rotatably supports a plurality of pinion gears 327 that intermesh with both the sun gear member 322 and the ring gear member 324. Planetary gear set 330 includes a sun gear member 332, a ring gear member 334 and a carrier member 336 that rotatably supports a plurality of pinion gears 337 that intermesh with both the sun gear member 332 and the ring gear member 334. Planetary gear set 340 includes a sun gear member 342, a ring gear member 344 and a carrier member 346 that rotatably supports a plurality of pinion gears 347 that intermesh with both the sun gear member 342 and the ring gear member 344. Planetary gear set 350 includes a sun gear member 352, a ring gear member 354 and a carrier member 356 that rotatably supports a plurality of pinion gears 357 that intermesh with both the sun gear member 352 and the ring gear member 354.

The input member 312 is continuously connected for common rotation with carrier member 326. The output member 314 is continuously connected for common rotation with carrier member 356. An interconnecting member 370 continuously interconnects sun gear member 332 for common rotation with ring gear member 324. An interconnecting member 372 continuously interconnects ring gear member 334 for common rotation with carrier member 346. An interconnecting member 374 continuously interconnects ring gear member 344 for common rotation with carrier member 356. An interconnecting member 376 continuously interconnects sun gear member 342 for common rotation with sun gear member 352. Each of the interconnecting members 370, 372, 374 and 376 may be one component or multiple components. The sun gear member 322 is continuously grounded to a housing 380 of the transmission 300 via a radially-extending structural member 378. The housing 380 circumferentially surrounds the gear sets 320, 330, 340 and 350 as well as the torque-transmitting mechanisms 360, 362, 364, 366 and 368. The transmission 300 further includes a first end wall 382 generally at one end of the transmission 300 and a second end wall 384 generally at an opposing end of the transmission 300. The housing 380 joins the first and second end walls 382, 384. It should be appreciated that the housing 380 and the first and second end walls 382, 384 form a transmission casing and may be integrated or separate components of the casing. The transmission casing will be referred to herein as 380, 382, 384. The transmission casing 380, 382, 384 defines a cavity 385. The end walls 382 and 384 enclose the cavity 385 axially, but are likely a conical or irregular shape rather than a planar shape as schematically depicted.

The torque-transmitting mechanisms 360, 362, 364, 366 and 368 are located in the cavity 385. The transmission casing 380, 382, 384 and the planetary gear sets 320, 330, 340, and 350 cooperate to define six spaces or zones I-VI within the cavity 385. A first zone I is defined between an outer surface 386 of the first end wall 382 and a plane 393 running generally parallel with a side of the planetary gear set 330 adjacent the first end wall 382, and runs radially outward to a circumferential boundary 390 running along a radially-outermost surface of each of the ring gear members 324, 334, 344 and 354. A second zone II is defined between a plane 394 running generally parallel along a side of the planetary gear set 320 facing the planetary gear set 340, a plane 395 running generally parallel along a side of the planetary gear set 340 facing the planetary gear set 320, and the circumferential boundary 390. A third zone III is defined between a plane 396 running generally parallel along a side of the planetary gear set 340 facing the planetary gear set 350, a plane 397 running generally parallel along a side of the planetary gear set 350 facing the planetary gear set 340, and the circumferential boundary 390. A fourth zone IV is defined between a plane 398 running generally parallel along a side of the planetary gear set 350 facing the planetary gear set 320, a plane 391 running generally parallel along a side of planetary gear set 320 facing planetary gear set 350 and the circumferential boundary 390. A fifth zone V is defined between a plane 392 running generally parallel along a side of the planetary gear set 320 facing the second end wall 384, an outer surface 387 of the second end wall 384 and the circumferential boundary 390. A sixth zone VI is defined between the circumferential boundary 390, an outer surface 389 of the housing 380, and the outer surfaces 386 and 387 of the first and second end walls 382 and 384, respectively. The structural member 378 traverses zones V and VI.

Torque-transmitting mechanisms 360, 362, 364, 366 and 368 are rotating-type clutches. Torque-transmitting mechanism 360 is selectively engagable to connect the ring gear member 354 for common rotation with the sun gear member 322. The torque-transmitting mechanism 362 is selectively engagable to connect the sun gear member 332 for common rotation with the sun gear member 342. The torque-transmitting mechanism 364 is selectively engagable to connect the carrier member 336 for common rotation with the carrier member 326. The torque-transmitting mechanism 366 is selectively engagable to connect the input member 312 and the carrier member 326 for common rotation with the sun gear member 342. The torque-transmitting mechanism 368 is selectively engagable to connect the carrier member 336 for common rotation with the ring gear member 354.

The transmission 300 provides eight forward speed ratios and one reverse speed ratio between the input member 312 and the output member 314. Specifically, a reverse speed ratio is established by engaging torque-transmitting mechanisms 360 and 368; a first forward speed ratio is established by engaging torque-transmitting mechanisms 360 and 366; a second forward speed ratio is established by engaging torque-transmitting mechanisms 360 and 362; a third forward speed ratio is established by engaging torque-transmitting mechanisms 360 and 364; a fourth forward speed ratio is established by engaging torque-transmitting mechanisms 362 and 364; a fifth forward speed ratio is established by engaging torque-transmitting mechanisms 364 and 366; a sixth forward speed ratio is established by engaging torque-transmitting mechanisms 364 and 368; a seventh forward speed ratio is established by engaging torque-transmitting mechanisms 366 and 368; and an eighth forward speed ratio is established by engaging torque-transmitting mechanisms 362 and 368.

Thus, single transition upshifts and downshifts are used between subsequent speed ratios.

As shown in FIG. 4A, torque-transmitting mechanisms 362 and 366 are located in zone II; torque-transmitting mechanism 368 is disposed in zone III; torque-transmitting mechanism 360 is located in zone IV; and torque-transmitting mechanism 364 is disposed in zone VI. Alternatively, the interconnections between the various gear members, the input member 312, the output member 314 obtained by selective engagement of the various torque-transmitting mechanisms 360, 362, 364, 366, and 368 as described above are possible with the torque-transmitting mechanisms 360, 362, 364, 366, and 368 disposed in other zones as shown in the chart of FIG. 4B. An "X" in the chart of FIG. 4B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 4B is feasible independently of the other rows. Accordingly, torque-transmitting mechanism 360 is locatable in any of two of the six possible zones; torque-transmitting mechanism 362 is locatable in any of two of the six possible zones; torque-transmitting mechanism 364 is locatable in any of three of the six possible zones; torque transmitting mechanism 366 is locatable in any of three of the six possible zones; and torque-transmitting mechanism 368 is locatable in any of four of the six possible zones.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   a transmission casing having a first end wall, a second end wall, and a housing portion interconnecting the first end wall and the second end wall; wherein the end walls and the housing portion define a cavity;
   an input member;
   an output member;
   first, second, third and fourth planetary gear sets within the cavity, each planetary gear set having a ring gear member, a sun gear member, and a carrier member rotatably supporting pinion gears intermeshing with both the ring gear member and the sun gear member;
   wherein the transmission casing and the planetary gear sets define six zones within the cavity, including a first zone extending axially from the first end wall to the second planetary gear set and extending radially to an outer periphery of the planetary gear sets; a second zone extending axially from the second planetary gear set to the first planetary gear set and extending radially to the outer periphery of the planetary gear sets, a third zone extending axially from the first planetary gear set to the third planetary gear set and extending radially to the outer periphery of the planetary gear sets, a fourth zone extending axially from the third planetary gear set to the fourth planetary gear set and extending radially to the outer periphery of the planetary gear sets, a fifth zone extending axially from the fourth planetary gear set to the second end wall and extending radially to the outer periphery of the planetary gear sets, and a sixth zone bordering the first, second, third, fourth and fifth zones and extending radially outward to the housing portion and axially between the first and second walls;
   wherein the ring gear member of the first planetary gear set is continuously connected for common rotation with the sun gear member of the second planetary gear set; wherein the ring gear member of the second planetary gear set is continuously connected for common rotation with the carrier member of the third planetary gear set; wherein the ring gear member of the third planetary gear set is continuously connected for common rotation with the carrier member of the fourth planetary gear set; wherein the sun gear member of the third planetary gear set is continuously connected for common rotation with the sun gear member of the fourth planetary gear set; wherein the sun gear member of the first planetary gear set is grounded to the transmission casing;
   a first torque-transmitting mechanism selectively engagable to ground the ring gear member of the fourth planetary gear set to the transmission casing;
   a second torque-transmitting mechanism selectively engagable to connect the ring gear member of the first planetary gear set for common rotation with the sun gear member of the third planetary gear set;
   a third torque-transmitting mechanism selectively engagable to connect the carrier member of the first planetary gear set for common rotation with the carrier member of the second planetary gear set;
   a fourth torque-transmitting mechanism selectively engagable to connect the carrier member of the first planetary gear set for common rotation with the sun gear member of the third planetary gear set;
   a fifth torque-transmitting mechanism selectively engagable to connect the carrier member of the second planetary gear set for common rotation with the ring gear member of the fourth planetary gear set;
   wherein the first torque-transmitting mechanism is located in one of the first, second, fifth and sixth zones; wherein the second torque-transmitting mechanism is located in one of the second, third and sixth zones; wherein the third torque-transmitting mechanism is located in one of the first, second and sixth zones; wherein the fourth torque-transmitting mechanism is located in one of the first, third and fifth zones; wherein the fifth torque-transmitting mechanism is located in one of the first, second, fifth and sixth zones; and
   wherein the torque-transmitting mechanisms are selectively engagable in different combinations to achieve eight forward speed ratios and a reverse speed ratio between the input member and the output member.

2. The transmission of claim 1, wherein the first torque-transmitting mechanism is located in the sixth zone; wherein the second torque-transmitting mechanism is located in the third zone; wherein the third torque-transmitting mechanism is located in the first zone; wherein the fourth torque-transmitting mechanism is located in the third zone; and wherein the fifth torque-transmitting mechanism is located in the sixth zone.

3. The transmission of claim 1, wherein the first torque-transmitting mechanism is located in the first zone.

4. The transmission of claim 1, wherein the first torque-transmitting mechanism is located in the second zone.

5. The transmission of claim 1, wherein the first torque-transmitting mechanism is located in the fifth zone.

6. The transmission of claim 1, wherein the first torque-transmitting mechanism is located in the sixth zone.

7. The transmission of claim 1, wherein the second torque-transmitting mechanism is located in the second zone.

8. The transmission of claim 1, wherein the second torque-transmitting mechanism is located in the third zone.

9. The transmission of claim 1, wherein the second torque-transmitting mechanism is located in the sixth zone.

10. The transmission of claim 1, wherein the third torque-transmitting mechanism is located in the first zone.

11. The transmission of claim 1, wherein the third torque-transmitting mechanism is located in the second zone.

12. The transmission of claim 1, wherein the third torque-transmitting mechanism is located in the sixth zone.

13. The transmission of claim 1, wherein the fourth torque-transmitting mechanism is located in the first zone.

14. The transmission of claim 1, wherein the fourth torque-transmitting mechanism is located in the third zone.

15. The transmission of claim 1, wherein the fourth torque-transmitting mechanism is located in the fifth zone.

16. The transmission of claim 1, wherein the fifth torque-transmitting mechanism is located in the first zone.

17. The transmission of claim 1, wherein the fifth torque-transmitting mechanism is located in the second zone.

18. The transmission of claim 1, wherein the fifth torque-transmitting mechanism is located in the fifth zone.

19. The transmission of claim 1, wherein the fifth torque-transmitting mechanism is located in the sixth zone.

* * * * *